US008419991B2

(12) United States Patent
Fink et al.

(10) Patent No.: US 8,419,991 B2
(45) Date of Patent: Apr. 16, 2013

(54) FREE-FLOWING PELLETS BASED ON CELLULOSE TEXTILE FIBERS AND A METHOD FOR THE PRODUCTION THEREOF

(75) Inventors: Hans-Peter Fink, Teltow (DE); Johannes Ganster, Potsdam (DE); Kurt Uihlein, Großheubach (DE); Alfred Zengel, Erlenbach (DE); Britta Zimmerer, Amorbach (DE)

(73) Assignee: Cordenka GmbH & Co. KG, Obernburg (DE)

( * ) Notice: Subject to any disclaimer, the term of this patent is extended or adjusted under 35 U.S.C. 154(b) by 670 days.

(21) Appl. No.: 11/663,301

(22) PCT Filed: Sep. 16, 2005

(86) PCT No.: PCT/EP2005/009953
§ 371 (c)(1),
(2), (4) Date: Apr. 30, 2007

(87) PCT Pub. No.: WO2006/032406
PCT Pub. Date: Mar. 30, 2006

(65) Prior Publication Data
US 2008/0020205 A1 Jan. 24, 2008

(30) Foreign Application Priority Data
Sep. 21, 2004 (DE) .......... 10 2004 045 711

(51) Int. Cl.
*B29B 9/14* (2006.01)
(52) U.S. Cl.
USPC ..................... 264/211.14; 264/143
(58) Field of Classification Search .............. 28/285; 264/211.14, 143
See application file for complete search history.

(56) References Cited

U.S. PATENT DOCUMENTS

| 2,794,759 | A | * | 6/1957 | Dildilian | 442/406 |
| 2,978,788 | A | * | 4/1961 | Keefe, Jr. | 28/285 |
| 3,519,477 | A | * | 7/1970 | Spoor et al. | 427/393.2 |
| 4,822,826 | A | * | 4/1989 | Pommier et al. | 521/84.1 |
| 5,227,238 | A | * | 7/1993 | Hirai et al. | 428/369 |
| 5,310,600 | A | * | 5/1994 | Tsuya et al. | 428/378 |
| 5,595,696 | A | * | 1/1997 | Schlarb et al. | 264/118 |
| 5,639,807 | A | * | 6/1997 | Secrist et al. | 523/215 |
| 6,284,098 | B1 | * | 9/2001 | Jacobsen | 162/150 |
| 6,322,893 | B1 | * | 11/2001 | Gauchel et al. | 428/424.6 |
| 6,444,187 | B1 | * | 9/2002 | Miyoshi et al. | 423/447.2 |
| 2001/0033928 | A1 | | 10/2001 | Kadowaki et al. | |
| 2003/0030176 | A1 | * | 2/2003 | Monovoukas et al. | 264/211 |
| 2004/0122133 | A1 | * | 6/2004 | Mohanty et al. | 524/35 |
| 2004/0234806 | A1 | * | 11/2004 | Cichocki et al. | 428/537.5 |
| 2005/0019561 | A1 | | 1/2005 | Gassan et al. | |

FOREIGN PATENT DOCUMENTS

| AU | 200066699 A1 | | 5/2001 |
| DE | 198 35 983 A1 | | 2/2000 |
| DE | 19835983 | * | 2/2000 |
| DE | 100 52 693 A1 | | 5/2001 |
| DE | 100 29 203 A1 | | 1/2002 |
| DE | 10029203 | * | 1/2002 |
| EP | 1 136 216 A1 | | 9/2001 |
| WO | WO 01/83598 A2 | | 11/2001 |
| WO | WO 02/10272 A1 | | 2/2002 |
| WO | WO 03/016011 A1 | | 2/2003 |
| WO | WO 03/033227 A1 | | 4/2003 |

OTHER PUBLICATIONS

Weigel, Ganster, Fink, Gassen, Uihlein: Kunststoffe 92, 2002, pp. 95-97 and English version thereof, pp. 35-37.
K. Stoeckert, "Kunststoff-Lexikoh", 8th Edition, Carl Hauser Verlag. Munich and Vienna, 1992, p. 528.

* cited by examiner

*Primary Examiner* — Joseph S Del Sole
*Assistant Examiner* — Kimberly A Stewart
(74) *Attorney, Agent, or Firm* — Oliff & Berridge, PLC

(57) ABSTRACT

A process for manufacturing free-flowing pellets based on cellulosic spun fibers. The process includes a) wetting at least one cellulosic spun-fiber strand with a preferably aqueous dispersion of a polymer and/or an oligomer for the purpose of applying sizing, b) drying the at least one spun-fiber strand, and c) comminuting the at least one spun-fiber strand into pellets. The free-flowing pellets are made from at least one comminuted spun-fiber strand having sizing made from a polymer and/or an oligomer. A fiber-reinforced thermoplastic includes finely distributed free-flowing pellets for manufacturing fiber-reinforced performs.

41 Claims, No Drawings

FREE-FLOWING PELLETS BASED ON CELLULOSE TEXTILE FIBERS AND A METHOD FOR THE PRODUCTION THEREOF

BACKGROUND OF THE INVENTION

1. Field of Invention

The present invention relates to a process for manufacturing free-flowing pellets to be used for fiber reinforcement of thermoplastics. More specifically, the present invention relates to a thermoplastic containing finely distributed free-flowing pellets for use as a thermoplastic for manufacturing fiber-reinforced preforms, and preforms of this type.

2. Description of Related Art

Often, use of cellulosic and/or lignocellulosic fibers as reinforcement components in polymeric matrices represents an increasingly utilized alternative for glass fiber reinforcement, as described for example in WO 02/10272 for thermoplastic matrices. Particularly in the automotive industry, components reinforced with hemp fibers, for example, are used for door trim and similar low-load-bearing structures in the car interior, as described for example in DE 100 52 693. Despite significant progress in recent years, the properties of polymers reinforced with natural fibers do not compare with those reinforced with glass fibers. In particular, there are significant shortcomings in the impact strength.

Maintaining the advantages of cellulosic fibers over glass fibers, such as low density (1.5 vs. 2.5 g/cm$^3$), low abrasion of the processing machines, and good recyclability and disposability, cellulosic spun fibers have recently been used as reinforcement components, primarily in thermoplastic matrices (see Weigel, Ganster, Fink, Gassan, Uihlein: Kunststoffe 92, 2002, pp. 95 to 97, WO 03/033227, and WO 03/016011). Besides the pultrusion process described in WO 03/03227, with a subsequent homogenization stage, which is a two-stage process, there is of course interest in a one-stage process for reasons of cost. The difficulty in this case, in strong contrast to glass fibers, is the introduction of sufficient fiber quantities, about 10 to 50% by mass, into the polymer melt. While such introduction must be gentle in the case of fragile glass fibers, the tougher cellulosic spun fibers are not sufficiently comminuted by the kneading and mixing components in the processing machines. Direct introduction at the start of the extrusion path therefore meets with considerable difficulty. Prior comminution of the fibers or the use of staple fibers, on the other hand, is problematical due to the low bulk density of the fiber material.

SUMMARY

In the light of these observations, it is an object of the present invention to provide pellets, made from cellulosic spun fibers, that exhibit a high degree of compactness and are distinguished by good flowing properties.

DETAILED DESCRIPTION OF EMBODIMENTS

The present invention relates to a process for manufacturing free-flowing pellets. The free-flowing pellets are achieved by a process for manufacturing free-flowing pellets based on cellulosic spun fibers. The process for manufacturing free-flowing pellets includes:

a) wetting at least one cellulosic spun-fiber strand with a preferably aqueous dispersion of a polymer and/or an oligomer for the purpose of applying sizing,
b) drying the at least one spun-fiber strand, and
c) comminuting the at least one spun-fiber strand into pellets.

The sizing merely ensures the coherence of the individual filaments as a strand, from which free-flowing pellets of arbitrary size are produced in the subsequent comminution step. Due to their free-flowing properties, these pellets can be further processed using a conventional metering apparatus to provide fiber reinforcement of thermoplastics, where the sizing has little if any influence on the composite properties.

Dispersion in the context of the present invention is understood to be a fine distribution of a polymeric and/or an oligomeric material in another material. The degree of dispersion can range from coarse-disperse systems with an average particle size of $>10^{-6}$ m, to colloid-disperse systems with an average particle size between $10^{-6}$ m and $10^{-9}$ m, and finally to molecular-disperse systems (particle size$<10^{-10}$ m), i.e., solutions. In the context of this invention, liquid dispersion agents and solid or liquid disperse polymers and/or oligomers are used. Such dispersions are known to one skilled in the art as emulsions or sols.

In another embodiment of the process of the invention, 3 to 20 spun-fiber strands are wetted simultaneously with the dispersion of the polymer and/or oligomer in step a). The spun-fiber strands wetted in this manner are then combined prior to drying. The combination in this case is preferably performed by twisting the spun-fiber strands. Twisting the fiber strand or strands allows an approximately circular cross-section to be obtained. The twisting is performed preferably with 5 to 500, especially preferably 10 to 30 twists per meter of spun-fiber strand.

To apply the sizing, a dispersion of a polymer is preferably used that is selected from the group comprising starch and its derivatives, cellulose derivatives, particularly methylcellulose or carboxymethylcellulose, polyvinyl acetate, polyacrylate, or a blend of the cited polymers. Especially preferred is the use of water-soluble polymers such as polyvinyl alcohol or carboxymethylcellulose. The preferably water-soluble polymers can be used individually in this case. It is also possible, however, to use blends of two or more of the cited polymers, preferably water-soluble polymers, provided the blend is dispersible, such as a blend of polyvinyl acetate and carboxymethylcellulose or of polyvinyl alcohol and starch.

However, dispersions of oligomeric substances can also be used, especially dextrin or its derivatives, where solutions of the oligomeric substances, particularly solutions of dextrin or its derivatives, are especially preferred.

The concentration of the sizing dispersion is adjusted in each case so that the fiber strand or strands can be wetted thoroughly or saturated, i.e., the viscosity of the dispersion must not be too high, and coherence of the fibers is ensured, in order to achieve pellet stability. Suitable concentrations for the sizing dispersion preferably range from 2 to 20% by weight, especially preferably 4 to 10% by weight. To reduce the viscosity and thus increase the application volume, it can be practical to heat the dispersion, for example to 60° C.

Suitable cellulosic spun fibers are not only synthetic cellulose fibers but also cellulose-containing natural fibers, especially hemp and flax. Especially preferred fibers are viscose and/or lyocell fibers.

In accordance with the invention, the sizing dispersion can be applied either in the yarn production process to fibers not previously dried, or in an aftertreatment step to the finished yarn.

To wet the at least one spun-fiber strand in step a) of the process of the invention, basically any procedure is suitable that enables the dispersion to cover as large a portion of the individual filaments of the spun-fiber strand as possible. This, therefore, includes all procedures commonly used to apply sizing to fibers. For example, the spun-fiber strand can be wetted by spraying it with a dispersion of the polymer and/or oligomer. It is likewise possible to guide the spun-fiber strand over a roll provided with a groove, where the groove contains the dispersion of the polymer and/or oligomer. The wetting of the at least one spun-fiber strand is preferably performed by dipping the cellulosic spun fibers into the preferably aqueous dispersion of the polymer and/or oligomer, i.e. by dipping it into the sizing dispersion. For example, a preferred embodiment of the process includes drawing the continuous cellulosic fibers in a continuous process through at least one bath containing the sizing dispersion, resulting in complete wetting of the fibers. If several fiber strands are saturated simultaneously in the solution, depending on their linear density, pellets can later be obtained with cross-sectional dimensions that permit good processing.

The underlying object of the invention is further achieved by free-flowing pellets based on cellulosic spun fibers, the pellets made from at least one comminuted spun-fiber strand to which sizing has been applied that is preferably made from a water-soluble polymer and/or oligomer.

The spun fibers of the pellets preferably consist of synthetic cellulose fibers and/or cellulose-containing natural fibers, particularly hemp or flax.

Especially preferred are spun fibers made from viscose and/or lyocell fibers.

The sizing preferably consists of a polymer selected from the group comprising starch and its derivatives, cellulose derivatives, in particular methylcellulose or carboxymethylcellulose, polyvinyl acetate, and polyacrylate. Especially preferred as sizing are water-soluble polymers such as polyvinyl alcohol or carboxymethylcellulose. The preferably water-soluble polymers in this case can be used individually. It is also possible, however, to use blends of two or more of the cited polymers, preferably water-soluble polymers, provided the blend is dispersible, such as a blend of polyvinyl acetate and carboxymethylcellulose or of polyvinyl alcohol and starch.

Likewise, however, the pellets can also have a sizing made from an oligomeric material, in particular an oligomeric dextrin or its derivatives.

The pellets have a substantially circular or preferably flattened cross-section, preferably with a diameter of 1 to 6 mm.

In another preferred embodiment, the pellets have a length ranging from 1 to 40 mm, especially 2 to 10 mm.

In another preferred embodiment, the pellets have a bulk density ranging from 100 g/l to 450 g/l, in particular from 150 g/l to 450 g/l, and especially preferably from 150 g/l to 300 g/l.

The free-flowing pellets according to the invention are preferably manufactured according to the previously described process according to the invention, wherein, as already mentioned, two variants for applying the sizing are preferred. In the first variant, the sizing is applied in the yarn production process to fibers that were not previously dried. In another variant of the process according to the invention, the sizing is applied to the finished yarn in an aftertreatment step.

Further according to the invention, hardened, fiber-reinforced thermoplastics are provided that contain finely distributed free-flowing pellets of the type previously described. This means that the pellets are finely dispersed during the manufacturing process for the fiber-reinforced thermoplastic, i.e., in the melt of the thermoplastic, resulting in the fibers previously contained in the pellets being present in a dispersed state in the finished, i.e., hardened fiber-reinforced thermoplastic.

Preferably, the hardened fiber-reinforced thermoplastic contains 10 to 60% by weight, particularly 15 to 35% by weight of pellets.

Possible thermoplastics include all thermoplastic materials known in the art, preferably those that can be processed, in particular extruded, by thermoplastic means, below a melt temperature of 240° C.

Especially preferred in this case are homo-polymers and copolymers of polypropylene and polyethylene, polyamide 11, polyamide 12, polyamide 6, polyesters such as polyethylene terephthalate, polystyrene, and impact-resistant modifications thereof, polylactic acid, plasticized polyvinyl chloride, and thermoplastic elastomers, blends, and modifications thereof.

The impact strength in the present invention is determined in impact/bending tests, which are described in K. Stoeckert, "Kunststoff Lexikon", 8th Ed., Carl Hauser Verlag, Munich and Vienna, 1992, p. 528, FIG. 94, left side, where measurements are taken according to DIN EN ISO 179 with a test specimen with dimensions of 80 mm×10 mm×4 mm. In the context of the present invention, Charpy impact strength means that an arrangement such as that in the previously cited FIG. 94, left side, is impacted against the flat side, but without a notch. Charpy notched impact strength in the present invention likewise means that an arrangement such as that in the previously cited FIG. 94, left side, is used, but in this case with impact on the edge, and the notch has the shape A described in DIN EN ISO 179.

Preferably, the hardened fiber-reinforced thermoplastic has a Charpy impact strength of at least 30 kJ/m$^2$ at room temperature (23° C.).

In another preferred embodiment, the hardened fiber-reinforced thermoplastic according to the invention has a Charpy notched impact strength of at least 5 kJ/m$^2$ at room temperature (23° C.).

The hardened fiber-reinforced thermoplastic according to the invention is distinguished by high levels of Charpy impact strength, which in preferred embodiments are higher by up to 46%, or notched up to 31%, at 23° C. and/or up to 43%, or notched up to 58%, at −18° C. than the corresponding values for a reference material in the prior art.

Furthermore, the hardened fiber-reinforced thermoplastics according to the invention can contain further additives, in particular adhesion agents.

The free-flowing pellets according to the invention find application for fiber reinforcement of thermoplastics.

The hardened fiber-reinforced thermoplastic according to the invention is distinguished by a uniform distribution of the reinforcing fibers in the thermoplastic, particularly when the reinforcing fiber exhibits a high degree of fibrillation, such as is the case with lyocell fibers, for example. This leads to an increased rigidity of the hardened fiber-reinforced thermoplastic that, when it is further processed in bulk form, for example as pellets, makes itself evident in the improved metering characteristics of the bulk material. For this reason, and of course also due to the previously described advantageous mechanical properties, the hardened fiber-reinforced thermoplastic according to the invention, or the hardened fiber-reinforced thermoplastic resulting from the use according to the invention of the free-flowing pellets, can advantageously be applied in the production of fiber-reinforced preforms that are used in particular in the automotive industry, for example to produce dashboards, door trim, and other load-bearing structures in a car interior.

Finally, the present invention also includes fiber-reinforced preforms resulting from the previously cited use, due to the advantageous mechanical properties that the hardened fiber-reinforced thermoplastic according to the invention imparts to these preforms.

The following examples explain the objects according to the invention, without being restrictive.

Example 1

Ten strands of the regenerated cellulose fiber material Cordenka 700 (Cordenka, 1350 single filaments per strand, filament linear density 1.8 dtex) are conducted through a solution with 5% by mass of hydroxypropyl starch (HPS, Emcol H7, Emslandstärke), combined, and subjected to a twist of 20 turns per meter. The composite strand is wound onto a spool and then dried in a conventional drying cabinet at 80° C. for 2 hours. The dried composite strand, with a diameter of 2 mm, is cut with scissors into pellets of 4 mm length. For larger quantities, commercial cutting tools (such as offered by Wolfangel) are used.

For processing, the pellets are placed into a separate metering apparatus (K-Tron K-CV-KT20) and, together with granulated polypropylene (Sabic Stamylan P 412MN40) and an adhesion agent (DSM Fusabond MD353D), fed to the mixing extruder (Berstorff ZE 25) and extruded, resulting in a fiber content of 25% by mass. After cooling, fiber-reinforced polypropylene pellets are produced, which after drying (4 h, 110° C., drying cabinet) are processed into standard test specimens (ISO 527) using an injection molding machine (Arburg Allrounder 270 M500-90). Selected mechanical properties are given in Table 1, compared to the composites produced in the conventional process that are identified as "reference" in the tables. (See Weigel, Ganster, Fink, Gassan, Uihlein, Kunststoffe 92, 2002, pp. 95-97). It is evident from Table 1 that the pellets according to the invention are significantly better than the reference material with respect to the Charpy impact strength, and in particular that for Charpy notched, at approximately equal values for strength, modulus, and elongation. The Charpy notched impact strength is 40% higher than that of the reference material.

TABLE 1

| Material | Strength MPa | Modulus GPa | Elongation % | Charpy kJ/m$^2$ | Charpy (notched) kJ/m$^2$ |
|---|---|---|---|---|---|
| Reference | 71 | 2.5 | 10.2 | $61_{23° C.}$ | $10_{23° C.}$ |
| From pellets (HPS) | 70 | 2.4 | 10.7 | $78_{23° C.}$ | $14_{23° C.}$ |

Example 2

The same procedure is used as in Example 1, but with a 4% by mass solution of methylcellulose (MC, baufan Tapetenkleister). Table 2 shows the mechanical properties compared to those obtained with the prior art process (reference). Table 2 shows that a fiber-reinforced thermoplastic whose fibers are wetted with MC exhibits lower strength and higher Charpy impact strength, at approximately equal values for modulus, elongation, and Charpy notched impact strength.

TABLE 2

| Material | Strength MPa | Modulus GPa | Elongation % | Charpy kJ/m$^2$ | Charpy (notched) kJ/m$^2$ |
|---|---|---|---|---|---|
| Reference | 71 | 2.5 | 10.2 | $61_{23° C.}$ | $10_{23° C.}$ |
| From pellets (MC) | 65 | 2.3 | 11.8 | $69_{23° C.}$ | $10_{23° C.}$ |

Example 3

In a continuous dipping/drying/cutting process, two yarns of the regenerated cellulose fiber material Cordenka 700 (Cordenka, 1350 single-filaments per yarn, yarn linear density 2440 dtex) are guided at a rate of 31.5 m/min over a wetting roll to which a sizing solution has been applied, and thereby dipped in the sizing solution, and are then dried and cut. An anionic, aqueous dispersion of a vinyl acetate homopolymer (Rhodopas® A 010, Rhodia PPMC), with a solids content of 8.3% by weight, serves as the sizing solution. The application of sizing solution to the wetting roll is performed in such a way that the dipped yarns have 10% by weight of sizing after drying, i.e., in the furnace-dried state. The drying takes place continuously and contact-free in three tube furnaces (Heraeus RO 07/250, nominal temperature of 1000° C.), which are arranged consecutively. The first furnace has a temperature of 560° C., the second furnace a temperature of 220° C., and the third furnace a temperature of 175° C. The dried yarns are cut into short-cut material with a length of 4 mm using a staple fiber cutting machine (Neumag NMC 150). A free-flowing short-cut material results.

For processing, the free-flowing short-cut material is placed into a separate metering apparatus (K-Tron K-CV-KT20) and, together with granulated polypropylene (Sabic Stamylan P 412MN40) and an adhesion agent (DSM Fusabond MD353D), fed to a mixing extruder (Berstorff ZE 25) and extruded, resulting in a fiber content of 30% by mass. After cooling, fiber-reinforced polypropylene pellets are produced, which after drying (4 h, 110° C., drying cabinet) are processed into standard test specimens (ISO 527) using an injection molding machine (Arburg Allrounder 270 M500-90).

Selected mechanical properties are given in Table 3, compared to the composites produced in the conventional process (Weigel, Ganster, Fink, Gassan, Uihlein, Kunststoffe 92, 2002, pp. 95-97). It is evident from Table 3 that, compared to the reference, the fiber-reinforced thermoplastic according to the invention, whose fibers were wetted with polyvinyl acetate from a Rhodopas® dispersion, exhibits, at lower strength and approximately equal values for modulus, elongation, and Charpy impact strength at 23° C. and −18° C., a 58% higher Charpy notched impact strength at 23° C.

TABLE 3

| Material | Strength Mpa | Modulus GPa | Elongation % | Charpy kJ/m$^2$ | Charpy (notched) kJ/m$^2$ |
|---|---|---|---|---|---|
| Reference | 74 | 2.8 | 8.5 | $56_{23° C.}$ $57_{-18° C.}$ | $11.3_{23° C.}$ $8.7_{-18° C.}$ |
| From pellets (Rhodopas ®) | 58.9 | 2.9 | 8.7 | $60_{23° C.}$ $54.3_{-18° C.}$ | $17.8_{23° C.}$ — |

Example 4

In a continuous dipping/drying/cutting process, two yarns of the regenerated cellulose fiber material Cordenka 700 (Cordenka, 1350 single-filaments per yarn, yarn linear density 2440 dtex) are guided at a rate of 31.5 m/min over a wetting roll to which a sizing solution has been applied, and thereby dipped in the sizing solution, and are then dried and cut. An anionic, aqueous vinyl acetate dispersion (BASF Perapret® VA 010), with a solids content of 8% by weight, serves as the sizing solution. The application of sizing solution to the wetting roll is performed in such a way that the dipped yarns have 14.5% by weight of sizing after drying, i.e., in the furnace-dried state. The drying takes place continuously and contact-free in three tube furnaces (Heraeus RO 07/250, nominal temperature of 1000° C.), which are arranged consecutively. The first furnace has a temperature of 560° C., the second furnace a temperature of 220° C., and the third furnace a temperature of 175° C. The dried yarns are cut into short-cut material with a length of 4 mm using a staple fiber cutting machine (Neumag NMC 150). A free-flowing short-cut material results.

For processing, the free-flowing short-cut material is placed into a separate metering apparatus (K-Tron K-CV-KT20) and, together with granulated polypropylene (Sabic Stamylan P 412MN40) and an adhesion agent (DSM Fusabond MD353D), fed to a mixing extruder (Berstorff ZE 25) and extruded, resulting in a fiber content of 30% by mass. After cooling, fiber-reinforced polypropylene pellets are produced, which after drying (4 h, 110° C., drying cabinet) are processed into standard test specimens (ISO 527) using an injection molding machine (Arburg Allrounder 270 M500-90).

Selected mechanical properties are given in Table 4, compared to the composites produced in the conventional process (Weigel, Ganster, Fink, Gassan, Uihlein, Kunststoffe 92, 2002, pp. 95-97). It is evident from Table 4 that, compared to the reference, the fiber-reinforced thermoplastic according to the invention, whose fibers were wetted with polyvinyl acetate from a Perapret® VA dispersion, exhibits, at lower strength and approximately equal values for modulus, elongation, and Charpy impact strength, a 49% higher Charpy notched impact strength at 23° C.

TABLE 4

| Material | Strength MPa | Modulus GPa | Elongation % | Charpy kJ/m$^2$ | Charpy (notched) kJ/m$^2$ |
|---|---|---|---|---|---|
| Reference | 74 | 2.8 | 8.5 | $56_{23°\,C.}$ $57_{-18°\,C.}$ | $11.3_{23°\,C.}$ $8.7_{-18°\,C.}$ |
| From pellets (Perapret ® VA) | 56 | 2.6 | 9 | $59_{23°\,C.}$ $65.6_{-18°\,C.}$ | $16.8_{23°\,C.}$ — |

Example 5

In a continuous dipping/drying/cutting process, two yarns of the regenerated cellulose fiber material Cordenka 700 (Cordenka, 1350 single-filaments per yarn, yarn linear density 2440 dtex) are guided at a rate of 21.5 m/min over a wetting roll to which a sizing solution has been applied, and thereby dipped in the sizing solution, and are then dried and cut. An anionic, aqueous polyacrylate solution (Schlichte CB, BASF), with a solids content of 4% by weight, serves as the sizing solution. The application of sizing solution to the wetting roll is performed in such a way that the dipped yarns have 4.8% by weight of sizing after drying, i.e., in the furnace-dried state. The drying takes place continuously and contact-free in three tube furnaces (Heraeus RO 07/250, nominal temperature of 1000° C.), which are arranged consecutively. The first furnace has a temperature of 410° C., the second furnace a temperature of 220° C., and the third furnace a temperature of 175° C. The dried yarns are cut into short-cut material with a length of 4 mm using a staple fiber cutting machine (Neumag NMC 150). A free-flowing short-cut material results.

For processing, the free-flowing short-cut material is placed into a separate metering apparatus (K-Tron K-CV-KT20) and, together with granulated polypropylene (Sabic Stamylan P 412MN40) and an adhesion agent (DSM Fusabond MD353D), fed to a mixing extruder (Berstorff ZE 25) and extruded, resulting in a fiber content of 30% by mass. After cooling, fiber-reinforced polypropylene pellets are produced, which after drying (4 h, 110° C., drying cabinet) are processed into standard test specimens (ISO 527) using an injection molding machine (Arburg Allrounder 270 M500-90).

Selected mechanical properties are given in Table 5, compared to the composites produced in the conventional process (Weigel, Ganster, Fink, Gassan, Uihlein, Kunststoffe 92, 2002, pp. 95-97). It is evident from Table 5 that, compared to the reference, the fiber-reinforced thermoplastic according to the invention, whose fibers were wetted with polyacrylate from a Schlichte CB solution, have approximately equal values for strength, modulus, elongation, Charpy impact strength, and Charpy notched impact strength.

TABLE 5

| Material | Strength Mpa | Modulus GPa | Elongation % | Charpy kJ/m$^2$ | Charpy (notched) kJ/m$^2$ |
|---|---|---|---|---|---|
| Reference | 74 | 2.8 | 8.5 | $56_{23°\,C.}$ $57_{-18°\,C.}$ | $11.3_{23°\,C.}$ $8.7_{-18°\,C.}$ |
| From pellets (Schlichte CB) | 70.1 | 2.5 | 8 | $50_{23°\,C.}$ $53.9_{-18°\,C.}$ | $9.7_{23°\,C.}$ |

Example 6

In a continuous dipping/drying/cutting process, two yarns of the regenerated cellulose fiber material Cordenka 700 (Cordenka, 1350 single-filaments per yarn, yarn linear density 2440 dtex) are guided at a rate of 47 m/min over a wetting roll to which a sizing solution has been applied, and thereby dipped in the sizing solution, and are then dried and cut. A mixture of equal parts by weight of an aqueous polyvinyl acetate dispersion containing 8.3% by weight of solids (Henkel Ponal) and an aqueous dispersion of carboxymethylcellulose (CMC, trade name DTE NV, Mikrotechnik CMC) containing 3% by weight of solids serves as the sizing solution. The application of sizing solution to the wetting roll is performed in such a way that the dipped yarns have 8.4% by weight of sizing after drying, i.e., in the furnace-dried state. The drying takes place continuously and contact-free in three tube furnaces (Heraeus RO 07/250, nominal temperature of 1000° C.), which are arranged consecutively. The first furnace has a temperature of 560° C., the second furnace a temperature of 220° C., and the third furnace a temperature of 175° C. The dried yarns are cut into short-cut material with a length of 4 mm using a staple fiber cutting machine (Neumag NMC 150). A free-flowing short-cut material results.

For processing, the free-flowing short-cut material is placed into a separate metering apparatus (K-Tron K-CV-KT20) and, together with granulated polypropylene (Sabic Stamylan P 412MN40) and an adhesion agent (DSM. Fusabond MD353D), fed to a mixing extruder (Berstorff ZE 25) and extruded, resulting in a fiber content of 30% by mass. After cooling, fiber-reinforced polypropylene pellets are produced, which after drying (4 h, 110° C., drying cabinet) are processed into standard test specimens (ISO 527) using an injection molding machine (Arburg Allrounder 270 M500-90).

Selected mechanical properties are given in Table 6, compared to the composites produced in the conventional process (Weigel, Ganster, Fink, Gassan, Uihlein, Kunststoffe 92, 2002, pp. 95-97). It is evident from Table 6 that, compared to the reference, the fiber-reinforced thermoplastic according to the invention, whose fibers were wetted with the previously described Ponal®/CMC mixture, exhibits approximately equal values for strength, modulus, elongation, Charpy impact strength and Charpy notched impact strength at 23° C. (values designated by "a"). Repetition of the example resulted in the values designated by "b" and demonstrates the reproducibility of the manufacturing process according to the invention. At −18° C., the Charpy and Charpy notched values are approximately 16% higher than the corresponding values for the reference material.

TABLE 6

| Material | Strength MPa | Modulus GPa | Elongation % | Charpy kJ/m$^2$ | Charpy (notched) kJ/m$^2$ |
|---|---|---|---|---|---|
| Reference | 74 | 2.8 | 8.5 | 56$_{23° C.}$ 57$_{−18° C.}$ | 11.3$_{23° C.}$ 8.7$_{−18° C.}$ |
| From pellets (Ponal/ CMC) 1/1 | a 71.8 b 73.6 | a 2.9 b 2.9 | a 9.2 b 9.7 | a 60$_{23° C.}$ a 66.8$_{−18° C.}$ b 63$_{23° C.}$ b 65$_{−18° C.}$ | a 12.1$_{23° C.}$ — b 12.7$_{23° C.}$ b 10.1$_{−18° C.}$ |

Example 7

In a continuous dipping/drying/cutting process, two yarns of the regenerated cellulose fiber material Cordenka 700 (Cordenka, 1350 single-filaments per yarn, yarn linear density 2440 dtex) are guided at a rate of 21.5 m/min over a wetting roll to which a sizing solution has been applied, and thereby dipped with the sizing solution, and are then dried and cut. An aqueous polyvinyl alcohol solution (BASF Schlichte PPL), with a solids content of 4% by weight, serves as the sizing solution. The application of sizing solution to the wetting roll is performed in such a way that the dipped yarns exhibit 8.5% by weight of sizing after drying, i.e., in the furnace-dried state. The drying takes place continuously and contact-free in three tube furnaces (Heraeus RO 07/250, nominal temperature of 1000° C.), which are arranged consecutively. The first furnace has a temperature of 41° C., the second furnace a temperature of 220° C., and the third furnace a temperature of 175° C. The dried yarns are cut into short-cut material with a length of 4 mm using a staple fiber cutting machine (Neumag NMC 150). A free-flowing short-cut material results.

For processing, the free-flowing short-cut material is placed into a separate metering apparatus (K-Tron K-CV-KT20) and, together with granulated polypropylene (Sabic Stamylan P 412MN40) and an adhesion agent (DSM Fusabond MD353D), fed to a mixing extruder (Berstorff ZE 25) and extruded, resulting in a fiber content of 30% by mass. After cooling, fiber-reinforced polypropylene pellets are produced, which after drying (4 h, 110° C., drying cabinet) are processed into standard test specimens (ISO 527) using an injection molding machine (Arburg Allrounder 270 M500-90).

Selected mechanical properties are given in Table 7, compared to the composites produced in the conventional process (Weigel, Ganster, Fink, Gassan, Uihlein, Kunststoffe 92, 2002, pp. 95-97). It is evident from Table 7 that, compared to the reference, the fiber-reinforced thermoplastic according to the invention, whose fibers were wetted with polyvinyl alcohol from a Schlichte PPL solution, has significantly higher Charpy and Charpy notched impact strength at 23° C., at approximately equal values for strength, elongation, and modulus. The Charpy impact strength at −18° C. is 43% higher than that of the reference material.

TABLE 7

| Material | Strength Mpa | Modulus GPa | Elongation % | Charpy kJ/m$^2$ | Charpy (notched) kJ/m$^2$ |
|---|---|---|---|---|---|
| Reference | 74 | 2.8 | 8.5 | 56$_{23° C.}$ 57$_{−18° C.}$ | 11.3$_{23° C.}$ 8.7$_{−18° C.}$ |
| From pellets (PPL) | 73.5 | 2.9 | 10 | 75$_{23° C.}$ 81.3$_{−18° C.}$ | 14.3$_{23° C.}$ — |

Example 8

In a continuous dipping/drying/cutting process, two yarns of the regenerated cellulose fiber material Cordenka 700 (Cordenka, 1350 single-filaments per yarn, yarn linear density 2440 dtex) are guided at a rate of 52 m/min over a wetting roll to which a sizing solution has been applied, and thereby dipped in the sizing solution, and are then dried and cut. A mixture of equal parts by weight of an aqueous polyvinyl alcohol solution (Schlichte PPL, BASF) containing 4% by weight of solids and an aqueous starch dispersion (Riedel-de-Haen) containing 6% by weight of solids serves as the sizing solution. The application of sizing solution to the wetting roll is performed in such a way that the dipped yarns exhibit 8.2% by weight of sizing after drying, i.e., in the furnace-dried state. The continuous, three-stage drying takes place contact-free in the first stage in a tube furnace (Heraeus RO 07/250, nominal temperature of 1000° C.). The second and third drying stages are performed by contact drying on first and second heated godets (each with a diameter of 12 cm), where each godet is wrapped four times, the first has a temperature of 175° C., and the second a temperature of 170° C. The dried yarns are cut into short-cut material with a length of 4 mm using a staple fiber cutting machine (Neumag NMC 150). A free-flowing short-cut material results.

For processing, the free-flowing short-cut material is placed into a separate metering apparatus (K-Tron K-CV-KT20) and, together with granulated polypropylene (Sabic Stamylan P 412MN40) and an adhesion agent (DSM Fusabond MD353D), fed to a mixing extruder (Berstorff ZE 25) and extruded, resulting in a fiber content of 30% by mass. After cooling, fiber-reinforced polypropylene pellets are produced, which after drying (4 h, 110° C., drying cabinet) are processed into standard test specimens (ISO 527) using an injection molding machine (Arburg Allrounder 270 M500-90).

Selected mechanical properties are given in Table 8, compared to the composites produced in the conventional process (Weigel, Ganster, Fink, Gassan, Uihlein, Kunststoffe 92, 2002, pp. 95-97). It is evident from Table 8 that, compared to the reference, the fiber-reinforced thermoplastic according to the invention, whose fibers were wet with the previously described PPL/starch mixture, has considerably higher Charpy and Charpy notched impact strength at 23° C., at approximately equal values for strength, modulus, and elongation. At −18° C., the Charpy value is 21% higher and the Charpy notched value 31% higher than the corresponding values for the reference material.

TABLE 8

| Material | Strength Mpa | Modulus GPa | Elongation % | Charpy kJ/m$^2$ | Charpy (notched) kJ/m$^2$ |
| --- | --- | --- | --- | --- | --- |
| Reference | 74 | 2.8 | 8.5 | $56_{23°\,C.}$ $57_{-18°\,C.}$ | $11.3_{23°\,C.}$ $8.7_{-18°\,C.}$ |
| From pellets PPL/Starch = 1/1 | 72.6 | 2.8 | 10.8 | $82_{23°\,C.}$ $69_{-18°\,C.}$ | $13.9_{23°\,C.}$ $11.4_{-18°\,C.}$ |

The invention claimed is:

1. A process for manufacturing free-flowing pellets containing cellulosic spun fibers, comprising the following steps in sequential order:
   a) wetting at least one cellulosic spun-fiber strand with a sizing dispersion of a polymer and/or an oligomer to apply sizing, wherein the polymer is selected from a group consisting of starch and its derivates, cellulose derivatives, polyvinyl acetate, polyvinyl alcohol, polyacrylate, and blends thereof, and wherein the oligomer is a dextrin or a derivative thereof,
   b) drying the at least one spun-fiber strand, and
   c) comminuting the at least one spun-fiber strand into pellets,
   wherein the pellets produced by comminuting the strand are free of thermoplastic polymer other than any that may be applied from the sizing dispersion.

2. The process according to claim 1, wherein in step a), 3 to 50 spun-fiber strands are wetted simultaneously with the dispersion of the polymer and/or oligomer, and wherein the strands are combined prior to drying.

3. The process according to claim 2, wherein the combining of the strands is performed by twisting the spun-fiber strands.

4. The process according to claim 3, wherein the twisting comprises 5 to 500 twists per meter of spun-fiber strand.

5. The process according to claim 1, wherein synthetic cellulose fibers and/or cellulose-containing natural fibers are used as the cellulosic spun fibers.

6. The process according to claim 1, wherein viscose fibers and/or lycocell fibers are used as the cellulosic spun fibers.

7. The process according to claim 1, wherein the sizing is applied during a yarn manufacturing process to the at least one cellulosic spun-fiber strand not previously dried.

8. The process according to claim 1, wherein the sizing is applied in an after treatment step following a yarn manufacturing process to the at least one cellulosic spun-fiber strand.

9. The process according to claim 1, wherein the wetting is performed by dipping in the dispersion of the polymer and/or oligomer.

10. Free-flowing pellets based on cellulosic spun fibers, the pellets made from at least one comminuted spun-fiber strand having sizing made from a polymer and/or an oligomer, wherein the polymer is selected from a group consisting of starch and its derivatives, cellulose derivatives, polyvinyl alcohol, polyvinyl acetate, polyacrylate and blends thereof, and wherein the oligomer is a dextrin or a derivative thereof, the free-flowing pellets being free from thermoplastic matrix polymer.

11. The free-flowing pellets according to claim 10, wherein the spun fibers are synthetic cellulose fibers and/or cellulose-containing natural fibers.

12. The free-flowing pellets according to claim 10, wherein the spun fibers are viscose fibers and/or lyocell.

13. The free-flowing pellets according to claim 10, wherein the pellets have a substantially circular cross-section or a substantially flattened cross-section.

14. The free-flowing pellets according to claim 10, wherein the pellets have a diameter of 1 mm to 6 mm.

15. The free-flowing pellets according to claim 10, wherein the pellets have a length of 1 mm to 40 mm.

16. The free-flowing pellets according to claim 10, wherein the pellets have a bulk density of 100 g/l to 450 g/l.

17. The free-flowing pellets according to claim 10, wherein the pellets can be manufactured by the process according to claim 1.

18. A hardened fiber-reinforced thermoplastic containing finely distributed free-flowing pellets according to claim 10.

19. The hardened fiber-reinforced thermoplastic according to claim 18, wherein 10 to 60% by weight of the pellets are contained in the thermoplastic.

20. The hardened fiber-reinforced thermoplastic according to claim 18, wherein the thermoplastic can be extruded by thermoplastic means below a melt temperature of 240° C.

21. The hardened fiber-reinforced thermoplastic according to claim 20, wherein the thermoplastic is selected from a group of homo-polymers and copolymers consisting of polypropylene, polyethylene, polyamide 11, polyamide 12, polyamide 6, polyethylene terephthalate, polystyrene, impact-resistant modifications thereof, polylactic acid, plasticized polyvinyl chloride, thermoplastic elastomers, blends, and modifications thereof.

22. The hardened fiber-reinforced thermoplastic according to claim 18, wherein the thermoplastic has a Charpy impact strength of at least 30 kJ/m$^2$ at room temperature.

23. The hardened fiber-reinforced thermoplastic according to claim 18, wherein the thermoplastic has a Charpy notched impact strength of at least 5 kJ/m$^2$ at room temperature.

24. The hardened fiber-reinforced thermoplastic according to claim 18, wherein the thermoplastic contains an adhesion agent.

25. The free-flowing pellets according to claim 10, wherein the pellets are a fiber reinforcement for thermoplastics.

26. The hardened fiber-reinforced thermoplastic according to claim 18, wherein the thermoplastic is manufactured into fiber-reinforced preforms.

27. The fiber-reinforced performs according to claim 26, wherein the fiber-reinforced preforms are dashboards or door trim.

28. The process according to claim 1, wherein the cellulose derivatives are methylcellulose or carboxymethylcellulose.

29. The process according to claim 4, wherein the twisting comprises 10 to 30 twists per meter of spun-fiber strand.

30. The process according to claim 5, wherein the cellulose-containing natural fibers are hemp.

31. The free-flowing pellets according to claim 10, wherein the cellulose derivatives are methylcellulose or carboxymethylcellulose.

32. The process according to claim 5, wherein the cellulose-containing natural fibers are hemp or flax.

33. The free-flowing pellets according to claim 16, wherein the pellets have a bulk density of 150 g/l to 450 g/l.

34. The hardened fiber-reinforced thermoplastic according to claim 19, wherein 15 to 35% by weight of the pellets are contained in the thermoplastic.

35. The process according to claim 1, wherein in step c), the spun-fiber strands have 4.8-14.5% by weight of sizing before comminuting.

36. The process according to claim 1, wherein the dispersion has a concentration ranging from 2 to 20% by weight.

37. The process according to claim 1, wherein the pellets have a bulk density ranging from 100 g/l to 450 g/l.

38. The process according to claim 1, wherein the pellets have a substantially circular or substantially flattened cross-section with a diameter of 1 to 6 mm.

39. A process for manufacturing a hardened fiber-reinforced thermoplastic, comprising the following steps in sequential order:
  a) wetting at least one cellulosic spun-fiber strand with a sizing dispersion of a polymer and/or an oligomer to apply sizing, wherein the polymer is selected from a group consisting of starch and its derivates, cellulose derivatives, polyvinyl acetate, polyvinyl alcohol, polyacrylate, and blends thereof, and wherein the oligomer is a dextrin or a derivative thereof,
  b) drying the at least one spun-fiber strand,
  c) comminuting the at least one spun-fiber strand into pellets, wherein the pellets produced by comminuting the strand are free of thermoplastic polymer other than any that may be applied from the sizing dispersion,
  d) dispersing the pellets in a melt of a thermoplastic, and
  e) hardening the melt of the thermoplastic with the pellets contained therein to form a hardened fiber-reinforced thermoplastic, wherein the hardened fiber-reinforced thermoplastic contains 15 to 35% by weight of pellets.

40. The process according to claim 39, wherein the strand comprises a plurality of filaments and the sizing is applied to the strand in a manner and amount such that the filaments cohere to each other.

41. The process according to claim 1, wherein the strand comprises a plurality of filaments and the sizing is applied to the strand in a manner and amount such that the filaments cohere to each other.

* * * * *